(12) United States Patent
Li et al.

(10) Patent No.: US 11,124,930 B1
(45) Date of Patent: Sep. 21, 2021

(54) CONSTRUCTION METHOD FOR IMPROVING EXPANSIVE SOIL EMBANKMENT USING PHOSPHOGYPSUM AND MICROBE

(71) Applicant: Institute of Geology and Geophysics, Chinese Academy of Sciences, Beijing (CN)

(72) Inventors: Zhiqing Li, Beijing (CN); Yingxin Zhou, Beijing (CN); Jianwei Hou, Beijing (CN); Pengpeng Zhang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 17/235,489

(22) Filed: Apr. 20, 2021

(30) Foreign Application Priority Data

Apr. 20, 2020 (CN) .......................... 202010314121.9

(51) Int. Cl.
| | | |
|---|---|---|
| *E01C 21/00* | (2006.01) | |
| *E01C 3/04* | (2006.01) | |
| *E01C 3/00* | (2006.01) | |
| *C04B 24/12* | (2006.01) | |
| *C04B 22/12* | (2006.01) | |
| *C04B 28/14* | (2006.01) | |
| *C04B 111/00* | (2006.01) | |
| *C04B 103/00* | (2006.01) | |

(52) U.S. Cl.
CPC ............ *E01C 21/00* (2013.01); *C04B 22/124* (2013.01); *C04B 24/126* (2013.01); *C04B 28/143* (2013.01); *E01C 3/003* (2013.01); *E01C 3/04* (2013.01); *C04B 2103/0001* (2013.01); *C04B 2111/0075* (2013.01)

(58) Field of Classification Search
CPC . E01C 3/003; E01C 3/04; E01C 21/00; C04B 22/124; C04B 24/126; C04B 28/143; C04B 2103/0001; C04B 2111/0075
USPC ............... 404/17–31, 75–82; 405/128.1–303
See application file for complete search history.

(56) References Cited

U.S. PATENT DOCUMENTS 4,448,566 A * 5/1984 King ....................... E01C 3/003
264/34
4,954,134 A * 9/1990 Harrison .................... B01J 2/28
23/313 R (Continued)

*Primary Examiner* — Raymond W Addie
(74) *Attorney, Agent, or Firm* — Stephen Y. Liu; Carstens & Cahoon, LLP

(57) ABSTRACT

Design and construction method for improving an expansive soil embankment using phosphogypsum and microbes, including the following steps: (1) placing *Bacillus pasteurii* into a culture medium to prepare a microbial solution, and mixing urea and calcium chloride with water to prepare a cementing fluid; (2) mixing and stirring a mixture, the microbial solution and water, adding the cementing solution well, and mixing the cementing fluid with water to prepare an improved mixture; and (3) leveling and compacting original ground, laying geomembranes, the improved mixture, and geogrids, laying a last layer of geomembrane on the top surface of the embankment after pavement of the embankment, and paving a roadbed. The design and construction method can meet construction requirements of highway embankment projects and roadbed projects of first-grade and other grades of roads, and consume solid waste phosphogypsum.

1 Claim, 1 Drawing Sheet

(56) References Cited

U.S. PATENT DOCUMENTS

| | | | | |
|---|---|---|---|---|
| 5,261,957 A * | 11/1993 | Thornsberry, Jr. | ............................ C04B 18/0445 | 106/735 |
| 5,277,826 A * | 1/1994 | Burns | ...................... C02F 11/18 | 106/624 |
| 5,735,640 A * | 4/1998 | Meyer | ...................... E01C 3/003 | 404/70 |
| 6,582,836 B2 * | 6/2003 | Wood | ...................... A23K 30/00 | 428/689 |
| 6,966,841 B1 * | 11/2005 | Sherman | ................ A63G 31/00 | 404/32 |
| 7,955,686 B2 * | 6/2011 | Halahmi | ................. E02D 17/20 | 428/141 |
| 8,142,101 B2 * | 3/2012 | Kaul | ..................... E01C 11/226 | 404/31 |
| 8,142,856 B2 * | 3/2012 | Chevalier | ........... C04B 20/1051 | 427/387 |
| 8,951,786 B1 * | 2/2015 | Dosier | .................. C04B 24/126 | 435/289.1 |
| 9,796,626 B2 * | 10/2017 | Dosier | ........... C12Y 305/01005 | |
| 2002/0009331 A1 * | 1/2002 | Carter, Jr. | ................. B09B 1/00 | 405/129.55 |
| 2004/0258476 A1 * | 12/2004 | Polivka, Jr. | ............. E01C 9/086 | 404/72 |
| 2009/0245936 A1 * | 10/2009 | Jones | ..................... D03D 15/44 | 404/2 |
| 2013/0045049 A1 * | 2/2013 | Krzyzak | .............. E01C 11/224 | 404/31 |
| 2013/0156501 A1 * | 6/2013 | Hemphill | .............. E01C 11/005 | 404/75 |
| 2016/0264463 A1 * | 9/2016 | Dosier | .................. C12N 11/02 | |
| 2016/0289418 A1 * | 10/2016 | Donovan | ........... B01J 20/28016 | |
| 2019/0210924 A1 * | 7/2019 | Royne | ..................... C04B 28/10 | |

\* cited by examiner

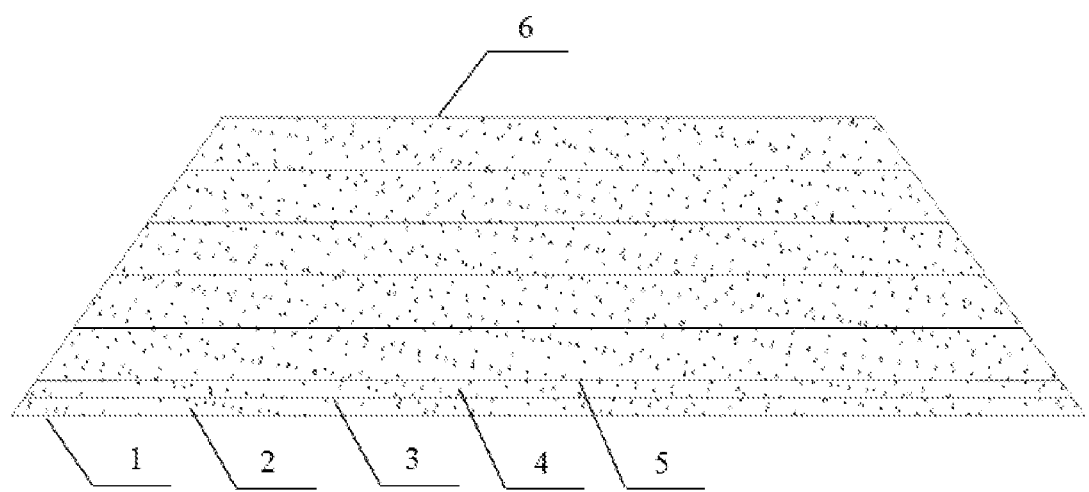

CONSTRUCTION METHOD FOR IMPROVING EXPANSIVE SOIL EMBANKMENT USING PHOSPHOGYPSUM AND MICROBE

CROSS REFERENCE TO RELATED APPLICATION

This application claims priority to Chinese Patent Application No. CN 202010314121.9 filed on Apr. 20, 2020, the entire content of which is hereby incorporated by reference. Every patent application and publication listed in this paragraph is hereby incorporated by reference in its entirety.

TECHNICAL FIELD

The present disclosure relates to the field of subgrade engineering, and in particular to a design and construction method for improving an expansive soil embankment using phosphogypsum and microbes.

BACKGROUND

Expansive soil contains rich clay minerals such as montmorillonite and illite, and has the characteristics of water swelling and drying shrinkage. Once an expansive soil embankment is immersed in water, expansive diseases will occur, thereby causing roadbed cracks. Traditional methods for disposing of expansive soil embankments mostly include cement improvement, lime improvement, and curing agent improvement, and other engineering measures. These methods can appropriately increase the roadbed bearing capacity, improve the expansion, and reduce the risk of roadbed cracks, but there are also diseases of uneven subgrade settlement caused by failure of improvement.

Phosphogypsum is a by-product produced by the wet process of phosphoric acid produced by the reaction of apatite and sulfuric acid in chemical plants. To produce 1 ton of phosphoric acid, about 5 tons of phosphogypsum will be produced. The phosphogypsum is a powdery material with almost no plasticity. Phosphoric acid, sulfuric acid and hydrofluoric acid remain. The phosphogypsum is acidic and contains abundant available phosphorus, which can be used for plant growth. In China, more than 8 million tons of phosphogypsum are produced annually. By the end of 2011, China had accumulated more than 300 million tons of phosphogypsum. If certain technical measures are adopted to apply phosphogypsum to engineering design, a large amount of phosphogypsum accumulated will be consumed. In one aspect, land resources are saved and phosphogypsum dams are protected from dam break disasters. In another aspect, the phosphogypsum can turn waste into wealth, having beneficial effects.

The soil contains a large number of microbes. Selecting microbes with certain functions for culture can be used to cement soil particles, solidify the soil, increase the bearing capacity, and reduce the expansion of the expansive soil.

SUMMARY

An objective of the present disclosure is to provide a design and construction method for improving an expansive soil embankment using phosphogypsum and microbes. In one aspect, the bearing capacity of the expansive soil embankment may be increased and the expansion of the expansive soil is reduced; in another aspect, solid waste phosphogypsum may be consumed to save land resources and turn waste into wealth.

The technical solution of the present disclosure is a design and construction method for improving an expansive soil embankment using phosphogypsum and microbes, including the following steps:

step 1, preparing a culture medium and a microbial solution, where a mixed solute in the culture medium includes soybean meal, $(NH_4)_2SO_4$, $Na_2HPO_4$, and NaOH, specifically including: weighing 40 parts by weight of soybean meal, 10 parts by weight of $(NH_4)_2SO_4$, 3.55 parts by weight of $Na_2HPO_4$, and 40 parts by weight of NaOH to prepare into the mixed solute of the culture medium, and mixing the mixed solute of the culture medium with water to prepare a liquid medium, where the content of the soybean meal in the liquid medium is controlled at 20-60 g/L; autoclaving the liquid medium in a 121° C. autoclave for 25 min, cooling to 30±2° C. for use; adding 1 part by volume of *Bacillus pasteurii* suspension to 100 parts by volume of liquid medium to prepare a microbial solution, placing the microbial solution into a constant temperature shaker incubator at 30° C., culturing at 200 rpm under shaking for more than 24 h until OD600 of *B. pasteurii* in the microbial solution is 1.5±0.2;

step 2, preparing a cementing fluid, where a mixed solute in the cementing fluid includes urea and calcium chloride, specifically including: weighing 2 parts by weight of urea and 1 part by weight of calcium chloride, where the urea is in granular, and the calcium chloride is powdery; mixing the mixed solute with water to prepare a cementing fluid with a concentration of 0.5±0.1 mol/L;

step 3, preparing a mixture, where the mixture includes phosphogypsum, fly ash, and expansive soil, specifically including: on a dry basis, weighing 3 parts by weight of phosphogypsum, 7 parts by weight of fly ash and 90 parts by weight of expansive soil, mixing and stirring well to prepare a mixture;

step 4, preparing an improved mixture, specifically including: weighing 50-60 parts by volume of mixture, 2 parts by volume of microbial solution, 10 parts by volume of cementing fluid, and 8 parts by volume of water, mixing the 50-60 parts by volume of mixture and the 2 parts by volume of microbial solution with 4 parts by volume of water, stirring well, adding the 10 parts by volume of cementing fluid and 4 parts by volume of water, and stirring well to prepare an improved mixture, where the microbial solution and the cementing liquid are only added once throughout the process;

step 5, leveling and compacting original ground, laying a first layer of geomembrane 1, and laying a first layer of improved mixture 2 over the first layer of geomembrane 1; after compacting in accordance with the requirements of compaction degree, laying a second layer of geomembrane 3 on the top surface of the first layer of improved mixture 2, laying a second layer of improved mixture 4 over the second layer of geomembrane 3, and compacting in accordance with the requirements of compaction degree, where it is required that laying and rolling compaction of well-prepared improved mixture are completed within 6 h, each layer of improved mixture has a thickness of uncompacted layer of 30-40 cm and is compacted by a road roller, and the geomembrane is a high-density polyethylene anti-seepage geomembrane;

step 6, laying a first layer of geogrid 5 on the top surface of the second layer of improved mixture 4, laying a third layer of improved mixture over the first layer of geogrid 5, and compacting in accordance with the requirements of compaction degree; laying one layer of geogrid every three layers of improved mixture laid, where the geogrid is a polypropylene biaxially stretched geogrid, and transverse-longitudinal tensile yield stress is required to be not less than 30 kN/m; and step 7, after pavement of the embankment, laying a last layer of geomembrane 6 on the top surface of the embankment, and paving a roadbed.

The present disclosure has the following advantages:

The construction method is simple, may meet the construction requirements of high-grade highway expansive soil embankment and consume solid waste phosphogypsum, reduce the occupation of cultivated land, and turn waste into wealth. A cheap culture medium may be used for microbial culture, and use costs may be reduced; the microbe-improved phosphogypsum may achieve solidification of harmful elements and reduce environmental pollution.

The application range of the present disclosure is as follows:

The present disclosure is suitable for highway embankment projects and roadbed projects of first-grade and other grades of roads.

BRIEF DESCRIPTION OF DRAWINGS

FIG. 1 is a schematic diagram of the design and construction of an expansive soil embankment improved by phosphogypsum and microbes. In the FIGURE: 1 represents a first layer of geomembrane, 2 represents a first layer of improved mixture, 3 represents a second layer of geomembrane, 4 represents a second layer of improved mixture, 5 represents a first layer of geogrid, and 6 represents a last layer of geomembrane.

DETAILED DESCRIPTION

Embodiment: A design and construction method for improving an expansive soil embankment using phosphogypsum and microbes included the following steps:

step 1, preparing a culture medium and a microbial solution: 40 kg of soybean meal, 10 kg of (NH4)2SO4, 3.55 kg of Na2HPO4, and 40 kg of NaOH were weighed and prepared into a mixed solute of the culture medium; the mixed solute of the culture medium was mixed with 1,000 kg of water to prepare a liquid medium; the liquid medium was autoclaved in a 121° C. autoclave for 25 min and cooled to 30° C. for use; 10 L of *B. pasteurii* suspension was added to the liquid medium to prepare a microbial solution; the microbial solution was placed into a constant temperature shaker incubator at 30° C., cultured at 200 rpm under shaking for more than 24 h until the $OD_{600}$ of the microbe in the solution was 1.5;

step 2, preparing a cementing fluid: 1,200 kg of urea and 600 kg of calcium chloride were weighed and mixed with water to prepare 10100 L of 0.5 mol/L cementing fluid;

step 3, preparing a mixture: 2.42 t of phosphogypsum, 5.64 t of fly ash and 72.54 t of expansive soil were weighed and mixed well to prepare a mixture;

step 4, preparing an improved mixture slurry: 57.57 m3 of mixture, 2.02 m3 of microbial solution and 4.04 m3 of water were mixed and stirred well, and stirred well with 10.1 m3 of cementing fluid and 4.04 m3 of water to prepare an improved mixture; the bulk density of the mixture was calculated at 1.4 g/cm3;

step 5, the original ground was leveled and compacted, a first layer of geomembrane was laid, and a first layer of improved mixture was laid over the first layer of geomembrane; after compacting in accordance with the requirements of compaction degree, a second layer of geomembrane was laid on the top surface of the first layer of improved mixture, and a second layer of improved mixture was laid over the second layer of geomembrane and compacted in accordance with the requirements of compaction degree;

step 6, a first layer of geogrid was laid on the top surface of the second layer of improved mixture, and a third layer of improved mixture was laid over the first layer of geogrid and compacted in accordance with the requirements of compaction degree; one layer of geogrid was laid every three layers of improved mixture laid;

step 7, after pavement of the embankment, a last layer of geomembrane was laid on the top surface of the embankment, and a roadbed was paved.

What is claimed is:

1. A design and construction method for improving an expansive soil embankment using phosphogypsum and microbes, comprising the following steps:

step 1, preparing a culture medium and a microbial solution, wherein a mixed solute in the culture medium comprises soybean meal, $(NH_4)_2SO_4$, $Na_2HPO_4$, and NaOH, specifically, weighing 40 parts by weight of soybean meal, 10 parts by weight of $(NH_4)_2SO_4$, 3.55 parts by weight of $Na_2HPO_4$, and 40 parts by weight of NaOH to prepare into the mixed solute of the culture medium, and mixing the mixed solute of the culture medium with water to prepare a liquid medium, wherein the content of the soybean meal in the liquid medium is controlled at 20-60 g/L; autoclaving the liquid medium in a 121° C. autoclave for 25 min, cooling to 30±2° C. for use; adding 1 part by volume of *Bacillus pasteurii* suspension to 100 parts by volume of liquid medium to prepare a microbial solution, placing the microbial solution into a constant temperature shaker incubator at 30° C., culturing at 200 rpm under shaking for more than 24 h until $OD_{600}$ of *Bacillus pasteurii* in the microbial solution is 1.5±0.2;

step 2, preparing a cementing fluid, wherein a mixed solute in the cementing fluid comprises urea and calcium chloride, specifically comprising: weighing 2 parts by weight of urea and 1 part by weight of calcium chloride, wherein the urea is in granular, and the calcium chloride is powdery; mixing the mixed solute with water to prepare a cementing fluid with a concentration of 0.5±0.1 mol/L;

step 3, preparing a mixture, wherein the mixture comprises phosphogypsum, fly ash and expansive soil, specifically comprising: on a dry basis, weighing 3 parts by weight of phosphogypsum, 7 parts by weight of fly ash and 90 parts by weight of expansive soil, mixing and stirring well to prepare a mixture;

step 4, preparing an improved mixture, specifically comprising: weighing 50-60 parts by volume of mixture, 2 parts by volume of microbial solution, 10 parts by volume of cementing fluid, and 8 parts by volume of water, mixing the 50-60 parts by volume of mixture and the 2 parts by volume of microbial solution with 4 parts by volume of water, stirring well, adding the 10 parts by volume of cementing fluid and 4 parts by volume of water, and stirring well to prepare an improved mixture, wherein the microbial solution and the cementing liquid are only added once throughout the process;

step 5, leveling and compacting original ground, laying a first layer of geomembrane 1, and laying a first layer of improved mixture 2 over the first layer of geomembrane 1; after compacting in accordance with the requirements of compaction degree, laying a second layer of geomembrane 3 on the top surface of the first layer of improved mixture 2, laying a second layer of improved mixture 4 over the second layer of geomembrane 3, and compacting in accordance with the requirements of compaction degree, wherein it is required that laying and rolling compaction of well-prepared improved mixture are completed within 6 h, each layer of improved mixture has a thickness of uncompacted layer of 30-40 cm and is compacted by a road roller, and the geomembrane is a high-density polyethylene anti-seepage geomembrane;

step 6, laying a first layer of geogrid 5 on the top surface of the second layer of improved mixture 4, laying a third layer of improved mixture over the first layer of geogrid 5, and compacting in accordance with the requirements of compaction degree; laying one layer of geogrid every three layers of improved mixture laid, wherein the geogrid is a polypropylene biaxially stretched geogrid, and transverse-longitudinal tensile yield stress is required to be not less than 30 kN/m; and step 7, after pavement of the embankment, laying a last layer of geomembrane on the top surface of the embankment, and paving a roadbed.

\* \* \* \* \*